June 3, 1941.　　　F. A. COSGROVE　　　2,244,609
CALLING DEVICE
Filed Aug. 12, 1937

INVENTOR
F. A. COSGROVE
BY
William R. Ballard
ATTORNEY

Patented June 3, 1941

2,244,609

UNITED STATES PATENT OFFICE 2,244,609

CALLING DEVICE

Frank A. Cosgrove, West Orange, N. J., assignor to American Telephone and Telegraph Company, a corporation of New York Application August 12, 1937, Serial No. 158,814

7 Claims. (Cl. 179—90)

This invention relates to impulse transmitters of the finger-wheel-operated type used in automatic telephony.

Its object is to provide an improved impulse transmitter of this type which facilitates the dialing operation.

In known finger-wheel-operated call transmitters the finger wheel is opaque and generally made of metal. Being opaque the finger wheel casts shadows on the number plate located below it which to some degree obscure the characters on the number plate. This condition is aggravated in locations where the light strikes the calling transmitter at an angle, and also when the finger wheel is rotating due to the animated shadows cast by the moving finger wheel on the face of the number plate. Furthermore, while the finger wheel is rotating the eclipsing of the letters and numbers by the metallic portions of the finger wheel located between the finger holes, and the relatively large segment of the finger wheel which has no finger holes, heightens the obscuring effect.

By virtue of applicant's invention the shadow effects above described are eliminated and the dialing operation is made simpler and easier. This improvement is achieved by making the finger wheel of transparent material. Thus the light may pass not only through the finger holes but also through the finger wheel itself to the characters on the number plate so that such characters may be seen through the various portions of the finger wheel lying between the line of vision of the subscriber and the number plate, whether the finger wheel is in motion or at rest. This improved finger wheel makes it possible for the subscriber to see and visually select the next letter or number to be dialed while the finger wheel is rotating back to its normal position just as clearly as though no finger wheel were present at all which saves time in dialing a call. This saving of time is particularly important in the case of numbers having numerous digits, since the number of wrong connections due to the calling party forgetting digits of the called number is proportional to the time required to transmit the consecutive digits representing that call. Dialing time is also reduced, by virtue of this invention due to the complete elimination of the shadow effects described.

In calling devices of the type commonly known as telephone dials, a rotatable finger wheel is provided through the operation of which the desired connection is obtained. The finger wheel is provided with apertures commonly known as finger holes to facilitate manual rotation of the wheel to a stop member. When the finger wheel is manually rotated to bring a predetermined finger hole to the stop member and is then released the finger wheel is returned by means of a motor spring to normal position. During the return movement of the finger wheel the calling device operates to send a number of impulses corresponding to the digit selected over a line system. Beneath the finger wheel is a stationary plate bearing letters and numbers which when used in predetermined order will make up a desired station call number. The letters and numbers are arranged in groups, each group being in alignment with a separate finger hole of the finger wheel so that the group of letters and digits may be seen through the corresponding finger hole.

To make a telephone call the subscriber observes the location of a required letter or number, inserts a finger in the finger hole in registry with such letter or number and manually rotates the finger wheel in a clockwise direction to the stop member. Upon release of the finger wheel by the subscriber the motor spring of the calling device returns the finger wheel to normal position. In the return movement of the finger wheel the calling device operates to send a set of impulses corresponding to the angular movement of the finger wheel. Each call letter and numeral included in the call designation of the substation desired must be separately dialed by the subscriber. The speed of the return movement of the finger wheel is controlled by means of a suitable governor.

Figure 1:
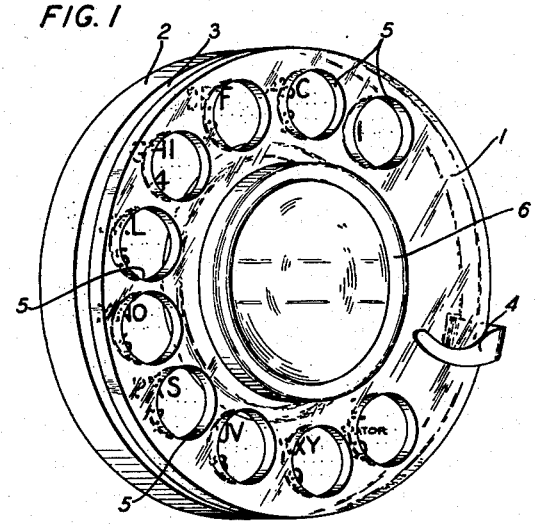
Figure 1 is a perspective view of a calling device embodying the finger wheel of this invention.

As shown in Fig. 1 a finger wheel 1 made of transparent material is provided on a calling device, the calling device comprising the casing 2, a stationary lettered and numbered plate 3 and a stop 4. The finger wheel 1 has a series of finger holes 5, each finger hole being normally in alignment with a group of letter and number characters on the stationary plate 3. The finger wheel 1 is held in place in a plane parallel to the plane of the stationary plate 3 by suitable means comprising the usual clamping nut engaging the shaft of the dial in a well known manner. The stop 4 is a fixed arm having a portion extending above the plane of the finger wheel 1. The finger wheel 1 may be manually rotated in a clockwise direction so as to tension the motor spring (not shown) and to bring a predetermined finger hole 5 around to the position of the stop 4. Upon the release of the finger wheel 1 the motor spring, located within the casing 2, serves to return the finger wheel 1 to normal position. While the finger wheel 1 is returning to normal position, the user of the calling device of this invention may readily see the letters and numbers on the stationary plate 3 and thus determine the location of the next letter or number to be dialed.

The finger wheel 1 may be made of any transparent material suitable for the purpose. I have found suitable for use, in the finger wheel structure, transparent cellulose acetate.

Figure 2:
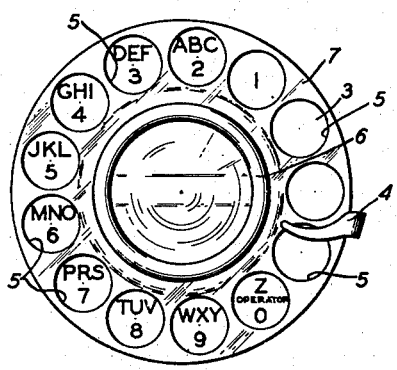
Fig. 2 is a front view of the calling device shown in Fig. 1 with a modified finger wheel.

In Fig. 2 a modification is shown in which finger holes additional to the number shown in Fig. 1 have been provided in the finger wheel 7, the additional finger holes serving to permit still more light to be transmitted to the stationary plate 3.

Figure 3:
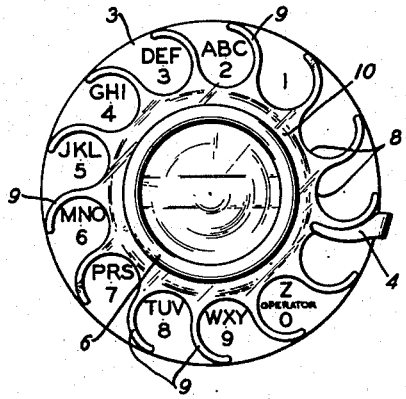
Fig. 3 is a front view of the calling device shown in Fig. 1 showing another modification of the finger wheel.

In Fig. 3 another modification is shown in which a transparent finger wheel 8 is provided as the manually operative element of the calling device. The finger wheel 8 has no outer rim but has curved finger hold portions 9 formed integrally with a central portion 10. The finger hold portions 9 are curved in a counter-clockwise direction and are so spaced relative to each other that each finger hold portion partially frames a group of letter and number characters on the stationary plate 3 when the finger wheel 8 is in normal position.

Figure 4:
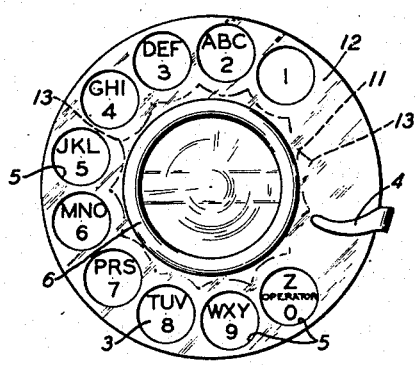
Fig. 4 is a front view of another modification of the finger wheel.
Figure 5:
Fig. 5 is a view in cross-section of the finger wheel shown in Fig. 4.

In Figs. 4 and 5 another modification is shown in which a metallic disc 11 in cooperation with a ring 12 of transparent material forms a finger wheel for the call transmitter of the device shown in Figs. 1, 2, 3 and 4. In this finger wheel, as shown in Figs. 4 and 5, the metallic disc 11 is provided at its periphery with a rim of reduced thickness embedded in the ring 12 of transparent material, the rim being provided with projections, as 13, for securely keying the metallic disc 11 into the transparent material.

Transparent materials which may be used for the rim 12 from the point of view of clearness have been found liable to break under the pressure of the securing nut due to their brittle characteristics while other of the glass clear transparent materials have been found to possess the so-called cold-flow characteristics under the pressure of the securing nut. According to the modification shown in Figs. 4 and 5, the use of a metallic disc at the center of the finger wheel, that is at the point of its greatest stress, effectively resists the forces applied perpendicularly to the finger wheel when operating it and effectively resists the pressure applied at this point by the tightening action of the securing nut while not interfering with the visual observation of the numbers and letters on the numbered disc through the transparent ring 12 whether the latter is at rest or in motion.

What is claimed is:

1. A calling device having an operating shaft and a numbered disc in combination with a wheel of transparent material having means for engaging the operating shaft and a plurality of finger holes disposed in registry with the numbers on said disc.

2. A calling device having an operating shaft and a numbered disc in combination with a wheel of transparent material having means at its center portion for engaging the operating shaft and a plurality of curved finger holds formed with said means for rotating said wheel.

3. A finger wheel for a dialing device, said finger wheel consisting of an opaque and a transparent element concentrically disposed and keyed to each other.

4. A calling device having an operating shaft and a numbered disc, in combination with an operating element consisting of a metallic disc serving for securing said element to the operating shaft and a rim of transparent material united to said metallic disc, said rim having finger holes disposed in registering relation with the numbers on the first-mentioned disc.

5. A finger wheel for a telephone calling device having a rotatable shaft and a numbered disc, said wheel consisting of a rim of non-metallic transparent material having finger holes disposed in registry to the numbers carried by the disc, and means of metallic material disposed concentric to said rim and having means for engaging said rim and the rotatable shaft.

6. A calling device having a rotatable shaft and a numbered disc in combination with a manually operable element for operating the shaft, said element consisting of a rim portion of transparent material and a metallic portion anchored in the transparent material and serving for securing the operating element to the rotatable shaft.

7. In a calling device, the combination with an operating shaft and a numbered disc, of a manually operable element for said device, said element consisting of metallic means secured to said shaft, said means having peripherally disposed projections, and a rim of transparent material forming the complemental portion of said element anchored to said means.

FRANK A. COSGROVE.